United States Patent
Henry et al.

(10) Patent No.: US 7,237,098 B2
(45) Date of Patent: Jun. 26, 2007

(54) APPARATUS AND METHOD FOR SELECTIVELY OVERRIDING RETURN STACK PREDICTION IN RESPONSE TO DETECTION OF NON-STANDARD RETURN SEQUENCE

(75) Inventors: G. Glenn Henry, Austin, TX (US); Thomas McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 547 days.

(21) Appl. No.: 10/679,830

(22) Filed: Oct. 6, 2003

(65) Prior Publication Data

US 2005/0076193 A1 Apr. 7, 2005

Related U.S. Application Data

(60) Provisional application No. 60/501,203, filed on Sep. 8, 2003.

(51) Int. Cl.
*G06F 9/40* (2006.01)
(52) U.S. Cl. ............... 712/238; 712/239; 712/240; 712/242; 712/243; 712/233; 712/234
(58) Field of Classification Search .......... 712/238, 712/239, 240, 242, 243, 233, 234
See application file for complete search history.

(56) References Cited

U.S. PATENT DOCUMENTS

| | | | |
|---|---|---|---|
| 4,181,942 A | 1/1980 | Forster et al. | |
| 4,200,927 A | 4/1980 | Hughes et al. | |
| 4,860,197 A | 8/1989 | Langendorf et al. | |
| 5,142,634 A | 8/1992 | Fite et al. | |
| 5,163,140 A | 11/1992 | Stiles et al. | |
| 5,313,634 A | * 5/1994 | Eickemeyer | ............... 712/240 |
| 5,353,421 A | 10/1994 | Emma et al. | |
| 5,355,459 A | 10/1994 | Matsuo et al. | |
| 5,394,530 A | 2/1995 | Kitta | |
| 5,404,467 A | 4/1995 | Saba et al. | |

(Continued)

OTHER PUBLICATIONS

*Microprocessor Report.* vol. 9. No. 2. Feb. 16, 1995. p. 5.

(Continued)

*Primary Examiner*—Donald Sparks
*Assistant Examiner*—Vincent Lai
(74) *Attorney, Agent, or Firm*—E. Alan Davis; James W. Huffman (57) ABSTRACT

A microprocessor for predicting a target address of a return instruction is disclosed. The microprocessor includes a BTAC and a return stack that each makes a prediction of the target address. Typically the return stack is more accurate. However, if the return stack mispredicts, update logic sets an override flag associated with the return instruction in the BTAC. The next time the return instruction is encountered, if the override flag is set, branch control logic branches the microprocessor to the BTAC prediction. Otherwise, the microprocessor branches to the return stack prediction. If the BTAC mispredicts, then the update logic clears the override flag. In one embodiment, the return stack predicts in response to decode of the return instruction. In another embodiment, the return stack predicts in response to the BTAC predicting the return instruction is present in an instruction cache line. Another embodiment includes a second, BTAC-based return stack.

48 Claims, 4 Drawing Sheets

U.S. PATENT DOCUMENTS

| | | | |
|---|---|---|---|
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A * | 2/1997 | Hoyt et al. | 712/243 |
| 5,623,614 A | 4/1997 | Van Dyke et al. | |
| 5,623,615 A | 4/1997 | Salem et al. | |
| 5,634,103 A | 5/1997 | Dietz et al. | |
| 5,687,349 A | 11/1997 | McGarity | |
| 5,687,360 A | 11/1997 | Chang | |
| 5,706,491 A | 1/1998 | McMahan | |
| 5,721,855 A | 2/1998 | Hinton et al. | |
| 5,734,881 A | 3/1998 | White et al. | |
| 5,752,069 A | 5/1998 | Roberts et al. | |
| 5,761,723 A | 6/1998 | Black et al. | |
| 5,768,576 A | 6/1998 | Hoyt et al. | |
| 5,805,877 A | 9/1998 | Black et al. | |
| 5,812,839 A | 9/1998 | Hoyt et al. | |
| 5,828,901 A | 10/1998 | O'Toole et al. | |
| 5,832,289 A | 11/1998 | Shaw et al. | |
| 5,850,532 A | 12/1998 | Narayan et al. | |
| 5,850,543 A | 12/1998 | Shiell et al. | |
| 5,864,707 A | 1/1999 | Tran et al. | |
| 5,867,701 A | 2/1999 | Brown et al. | |
| 5,881,260 A | 3/1999 | Raje et al. | |
| 5,881,265 A | 3/1999 | McFarland et al. | |
| 5,931,944 A | 8/1999 | Ginosar et al. | |
| 5,948,100 A | 9/1999 | Hsu et al. | |
| 5,961,629 A | 10/1999 | Nguyen et al. | |
| 5,964,868 A * | 10/1999 | Gochman et al. | 712/234 |
| 5,968,169 A | 10/1999 | Pickett | |
| 5,974,543 A | 10/1999 | Hilgendorf et al. | |
| 5,978,909 A | 11/1999 | Lempel | |
| 6,035,391 A | 3/2000 | Isaman | |
| 6,041,405 A | 3/2000 | Green | |
| 6,044,459 A | 3/2000 | Bae et al. | |
| 6,081,884 A | 6/2000 | Miller | |
| 6,085,311 A | 7/2000 | Narayan et al. | |
| 6,088,793 A | 7/2000 | Liu et al. | |
| 6,101,595 A | 8/2000 | Pickett et al. | |
| 6,108,773 A | 8/2000 | Col et al. | |
| 6,122,729 A | 9/2000 | Tran | |
| 6,134,654 A * | 10/2000 | Patel et al. | 712/233 |
| 6,151,671 A | 11/2000 | D'Sa et al. | |
| 6,157,988 A | 12/2000 | Dowling | |
| 6,170,054 B1 * | 1/2001 | Poplingher | 712/242 |
| 6,175,897 B1 | 1/2001 | Ryan et al. | |
| 6,185,676 B1 | 2/2001 | Poplingher et al. | |
| 6,233,676 B1 | 5/2001 | Henry et al. | |
| 6,250,821 B1 | 6/2001 | Schwendinger | |
| 6,256,727 B1 | 7/2001 | McDonald | |
| 6,260,138 B1 | 7/2001 | Harris | |
| 6,279,105 B1 | 8/2001 | Konigsburg et al. | |
| 6,279,106 B1 | 8/2001 | Roberts | |
| 6,308,259 B1 | 10/2001 | Witt | |
| 6,314,514 B1 | 11/2001 | McDonald | |
| 6,321,321 B1 | 11/2001 | Johnson | |
| 6,351,796 B1 | 2/2002 | McCormick et al. | |
| 6,374,350 B1 | 4/2002 | D'Sa et al. | |
| 6,457,120 B1 | 9/2002 | Sinharoy | |
| 6,502,185 B1 | 12/2002 | Keller et al. | |
| 6,560,696 B1 * | 5/2003 | Hummel et al. | 712/237 |
| 6,601,161 B2 | 7/2003 | Rappoport et al. | |
| 6,647,467 B1 | 11/2003 | Dowling | |
| 6,725,357 B1 | 4/2004 | Cousin | |
| 6,748,441 B1 | 6/2004 | Gemmell | |
| 6,754,808 B1 | 6/2004 | Roth et al. | |
| 6,823,444 B1 | 11/2004 | Henry et al. | |
| 6,886,093 B2 | 4/2005 | Henry | |
| 6,895,498 B2 | 5/2005 | McDonald et al. | |
| 6,898,699 B2 * | 5/2005 | Jourdan et al. | 712/243 |
| 6,968,444 B1 | 11/2005 | Kroesche et al. | |
| 2002/0188833 A1 | 12/2002 | Henry et al. | |
| 2002/0194460 A1 | 12/2002 | Henry et al. | |
| 2002/0194461 A1 | 12/2002 | Henry et al. | |
| 2002/0194464 A1 | 12/2002 | Henry et al. | |
| 2004/0030866 A1 | 2/2004 | McDonald | |
| 2004/0139281 A1 | 7/2004 | McDonald | |
| 2004/0139292 A1 | 7/2004 | McDonald | |
| 2004/0139301 A1 | 7/2004 | McDonald | |
| 2004/0143709 A1 | 7/2004 | McDonald | |
| 2004/0143727 A1 | 7/2004 | McDonald | |
| 2005/0044343 A1 | 2/2005 | Henry et al. | |
| 2005/0076193 A1 | 4/2005 | Henry et al. | |
| 2005/0114636 A1 | 5/2005 | McDonald et al. | |
| 2005/0132175 A1 | 6/2005 | Henry et al. | |
| 2005/0198479 A1 | 9/2005 | Bean et al. | |
| 2005/0198481 A1 | 9/2005 | Henry et al. | |

OTHER PUBLICATIONS

*Microprocessor Report.* Aug. 23, 1999. p. 7.

Yeh et al. *Alternative Implementation of Two-Level Adaptive Branch Prediction.* 19th Annual International Symposium on Computer Architecture. pp. 124-134. May 19-21, 1992. Gold Coast, Australia.

Chang et al. *Alternative Implementations of Hybrid Branch Predictors.* Proceedings of MICRO-28. 1995. IEEE.

Mc Farling, Scott. *WRL Technical Note TN-36.* Combining Branch Predictors. Jun. 1993. Western Research Laboratory, 250 Unversity Ave., Palo Alto, CA 94301.

Bray et al. *Strategies For Branch Target Buffers.* Technical Report No. CSL-TR-91-480. Jun. 1991.

Sakamoto et al. *Microarchitecture Support for Reducing Branch Penalty in a Superscaler Processor.* pp. 208-216. Mittsubishi Electric Corp. 4-1 Mizuhara, Itaml, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

IBM Technical Disclosure Bulletin NN9204269, "Return Address Stack Cache." Apr. 1992, pp. 269-271.

Online Computing Dictionary. http://instantweb.com/d/dictionary/foldoc.cgi?query=btb May 5, 1995. Branch Target Buffer The D Latch, Play-Hookey Web Page, Oct. 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1996.

Patterson et al. "Computer Organization & Design: The Hardware/Software Interface." Morgan Kaufmann Publishers, Inc. San Francisco, CA. 1998 p. 453-455.

* cited by examiner

Fig. 1

Return Stack Override Operation

Return Stack Override Operation (Alternate Embodiment)

Fig. 6

APPARATUS AND METHOD FOR SELECTIVELY OVERRIDING RETURN STACK PREDICTION IN RESPONSE TO DETECTION OF NON-STANDARD RETURN SEQUENCE

PRIORITY INFORMATION

This application claims priority based on U.S. Provisional Application, Ser. No. 60/501,203, filed Sep. 8, 2003, entitled APPARATUS AND METHOD FOR OVERRIDING RETURN STACK PREDICTION IN RESPONSE TO DETECTION OF NON-STANDARD RETURN.

FIELD OF THE INVENTION

This invention relates in general to the field of branch prediction in microprocessors and particularly to return instruction target address prediction using return stacks and branch target address caches.

BACKGROUND OF THE INVENTION

A microprocessor is a digital device that executes instructions specified by a computer program. Modern microprocessors are typically pipelined. That is, they operate on several instructions at the same time, within different blocks or pipeline stages of the microprocessor. Hennessy and Patterson define pipelining as, "an implementation technique whereby multiple instructions are overlapped in execution." Computer Architecture: A Quantitative Approach, $2^{nd}$ edition, by John L. Hennessy and David A. Patterson, Morgan Kaufmann Publishers, San Francisco, Calif., 1996. They go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

A potential cause of pipeline bubbles is branch instructions. When a branch instruction is encountered, the processor must determine the target address of the branch instruction and begin fetching instructions at the target address rather than the next sequential address after the branch instruction. Because the pipeline stages that definitively determine the target address are well below the stages that fetch the instructions, bubbles are created by branch instructions. As discussed more below, microprocessors typically include branch prediction mechanisms to reduce the number of bubbles created by branch instructions.

One particular type of branch instruction is a return instruction. A return instruction is typically the last instruction executed by a subroutine for the purpose of restoring program flow to the calling routine, which is the routine that caused program control to be given to the subroutine. In a typical program sequence, the calling routine executes a call instruction. The call instruction instructs the microprocessor to push a return address onto a stack in memory and then to branch to the address of the subroutine. The return address pushed onto the stack is the address of the instruction that follows the call instruction in the calling routine. The subroutine ultimately executes a return instruction, which pops the return address off the stack, which was previously pushed by the call instruction, and branches to the return address, which is the target address of the return instruction. An example of a return instruction is the x86 RET instruction. An example of a call instruction is the x86 CALL instruction.

An advantage of performing call/return sequences is that it allows subroutine call nesting. For example, a main routine may call subroutine A that pushes a return address; and subroutine A may call subroutine B that pushes a return address; then subroutine B executes a return instruction that pops the return address pushed by subroutine A; then subroutine A executes a return instruction that pops the return address pushed by the main routine. The notion of nesting subroutine calls is very useful and the example above may be extended to as many calls deep as the stack size can support.

Because of the regular nature of call/return instruction sequences, modern microprocessors employ a branch prediction mechanism commonly referred to as a return stack to predict the target addresses of return instructions. The return stack is a small buffer that caches return addresses in a last-in-first-out manner. Each time a call instruction is encountered, the return address to be pushed onto the memory stack is also pushed onto the return stack. Each time a return instruction is encountered, the return address at the top of the return stack is popped and used as the predicted target address of the return instruction. This operation reduces bubbles, since the microprocessor does not have to wait for the return address to be fetched from the memory stack.

Return stacks typically predict return instruction target addresses very accurately due to the regular nature of call/return sequences. However, the present inventors have discovered that certain programs, such as certain operating systems, do not always execute call/ret instructions in the standard fashion. For example, code executing on an x86 microprocessor may include a CALL, then a PUSH to place a different return address on the stack, then a RET, which causes a return to the pushed return address rather than to the address of the instruction after the CALL, which was pushed onto the stack by the CALL. In another example, the code performs a PUSH to place a return address on the stack, then performs a CALL, then performs two RET instructions, which causes a return to the pushed return address in the case of the second RET rather than to the instruction after a CALL that preceded the PUSH. This behavior causes a misprediction by a return stack.

Therefore, what is needed is an apparatus for more accurately predicting a return instruction target address, particularly for code that executes a non-standard call/return sequence.

SUMMARY

The present invention provides an apparatus for detecting a return stack misprediction and responsively setting an override flag associated with the return instruction so that upon the next occurrence of the return instruction the microprocessor can predict the return instruction target address by a mechanism other than the return stack. A branch target address cache (BTAC) is employed to store the override flag associated with the return instruction. In one embodiment, the other mechanism for predicting the return instruction target address is the BTAC, which is perhaps typically less accurate at predicting a return instruction target address than the return stack in the case of a normal call/return sequence, but more accurate in the case of code that executes a non-standard call/return sequence.

In one aspect the present invention provides a microprocessor. The microprocessor includes a return stack that provides a first prediction of a target address of a return instruction. The microprocessor also includes a branch target address cache (BTAC) that provides a second prediction of the target address of the return instruction and an override indicator. The override indicator indicates a predetermined value if the first prediction mispredicted the target address for a first instance of the return instruction. The microprocessor also includes branch control logic, coupled to the return stack and the BTAC, which causes the microprocessor to branch to the second prediction of the target address, and not to the first prediction, for a second instance of the return instruction, if the override indicator indicates the predetermined value.

In another aspect, the present invention provides an apparatus for improving branch prediction accuracy in a microprocessor having a branch target address cache (BTAC) and a return stack that each generate a prediction of a target address of a return instruction. The apparatus includes an override indicator. The apparatus also includes update logic, coupled to the override indicator, which updates the override indicator to a true value if the prediction generated by the return stack mispredicted the target address of a first occurrence of the return instruction. The apparatus also includes branch control logic, coupled to the override indicator, which selects the prediction generated by the BTAC for a second occurrence of the return instruction, rather than selecting the prediction generated by the return stack, if the override indicator is true.

In another aspect, the present invention provides a method for predicting a target address of a return instruction in a microprocessor. The method includes updating an override indicator to a true value in response to a return stack mispredicting the target address of the return instruction. The method also includes a branch target address cache (BTAC) generating a prediction of the target address subsequent to the updating. The method includes determining whether the override indicator has a true value after the BTAC generates the prediction. The method includes branching the microprocessor to the prediction generated by the BTAC if the override indicator has a true value.

In another aspect, the present invention provides apparatus for improving branch prediction accuracy in a microprocessor having a return stack and an alternate prediction apparatus that each generates a prediction of a target address of a return instruction, and a branch target address cache (BTAC). The apparatus includes an override indicator, provided by the BTAC. The apparatus also includes update logic, coupled to the override indicator, which updates the override indicator in the BTAC to a true value if the prediction generated by the return stack mispredicted the target address of a first occurrence of the return instruction. The apparatus also includes branch control logic, coupled to the override indicator, which selects the prediction generated by the alternate prediction apparatus for a second occurrence of the return instruction, rather than selecting the prediction generated by the return stack, if the override indicator is true.

In another aspect, the present invention provides a computer data signal embodied in a transmission medium, comprising computer-readable program code for providing a microprocessor. The program code includes first program code for providing a return stack, for providing a first prediction of a target address of a return instruction. The program code also includes second program code for providing a branch target address cache (BTAC), for providing a second prediction of the target address of the return instruction, and for providing an override indicator. The override indicator indicates a predetermined value if the first prediction mispredicted the target address for a first instance of the return instruction. The program code also includes third program code for providing branch control logic, coupled to the return stack and the BTAC, for causing the microprocessor to branch to the second prediction of the target address, and not to the first prediction, for a second instance of the return instruction, if the override indicator indicates the predetermined value.

An advantage of the present invention is that it potentially improves branch prediction accuracy of programs that engage in non-standard call/return sequences. Simulations performed have shown a performance improvement on benchmark scores when employing the override mechanism as described in embodiments herein. Additionally, the advantage is realized with the addition of a small amount of hardware if a microprocessor already includes a BTAC and an alternate return instruction target address prediction mechanism.

Other features and advantages of the present invention will become apparent upon study of the remaining portions of the specification and drawings.

DETAILED DESCRIPTION

Figure 1:
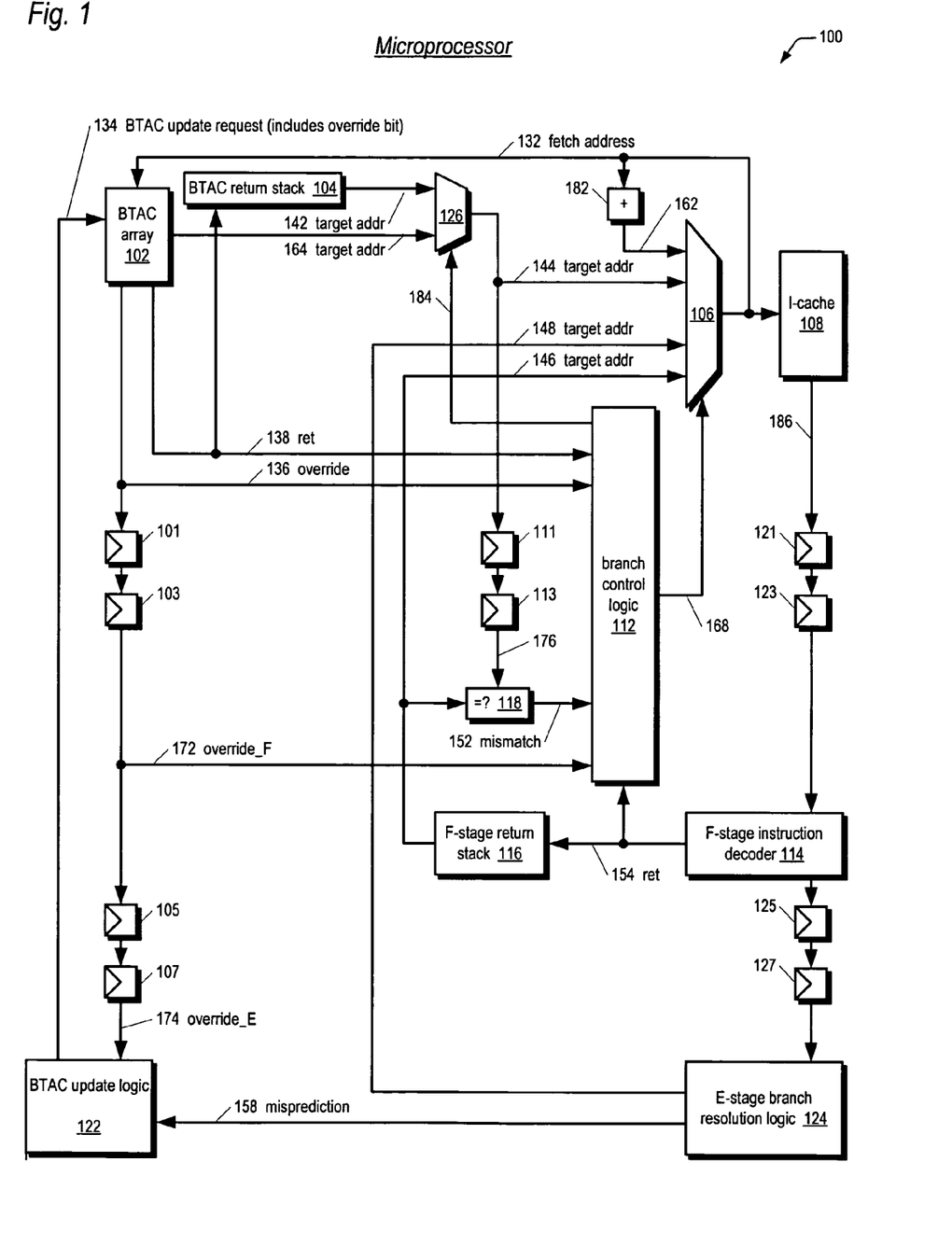
FIG. 1 is a block diagram of a pipelined microprocessor according to the present invention.

Referring now to FIG. 1, a block diagram of a pipelined microprocessor 100 according to the present invention is shown. In one embodiment, microprocessor 100 comprises a microprocessor whose instruction set conforms substantially to an x86 architecture instruction set, including x86 CALL and RET instructions. However, the present invention is not limited to x86 architecture microprocessors, but rather may be employed in any microprocessor that employs a return stack to predict target addresses of return instructions.

Microprocessor 100 includes an instruction cache 108. The instruction cache 108 caches instruction bytes from a system memory coupled to microprocessor 100. Instruction cache 108 caches lines of instruction bytes. In one embodiment, a cache line comprises 32 bytes of instruction bytes. Instruction cache 108 receives a fetch address 132 from a multiplexer 106. Instruction cache 108 outputs a cache line of instruction bytes 186 specified by fetch address 132 if fetch address 132 hits in instruction cache 108. In particular, the cache line of instruction bytes 186 specified by fetch address 132 may include one or more return instructions. The instruction bytes 186 are piped down the microprocessor 100 pipeline via pipeline registers 121 and 123, as shown. Although only two pipeline registers 121 and 123 are shown for piping down instruction bytes 186, other embodiments may include more pipeline stages.

Microprocessor 100 also includes an instruction decoder, referred to as F-stage instruction decoder 114, coupled to the output of pipeline register 123. Instruction decoder 114 receives instruction bytes 186 and related information and decodes the instruction bytes. In one embodiment, microprocessor 100 supports instructions of variable length. Instruction decoder 114 receives a stream of instruction bytes and formats the instructions into discrete instructions, determining the length of each instruction. In particular, instruction decoder 114 generates a true value on a ret signal 154 to indicate that it has decoded a return instruction. In one embodiment, microprocessor 100 includes a reduced-instruction-set-computer (RISC) core that executes microinstructions, and instruction decoder 114 translates macroinstructions, such as x86 macroinstructions, into microinstructions of the native RISC instruction set. The microinstructions are piped down the microprocessor 100 pipeline via pipeline registers 125 and 127, as shown. Although only two pipeline registers 125 and 127 are shown for piping down the microinstructions, other embodiments may include more pipeline stages. For example, the stages may include a register file, an address generator, a data load/store unit, an integer execution unit, a floating-point execution unit, an MMX execution unit, an SSE execution unit, and an SSE-2 execution unit.

Microprocessor 100 also includes branch resolution logic, referred to as E-stage branch resolution logic 124, coupled to the output of pipeline register 127. Branch resolution logic 124 receives branch instructions, including return instructions, as they migrate down the microprocessor 100 pipeline and makes a final determination of the target address of all branch instructions. Branch resolution logic 124 provides the correct branch instruction target address as an input to multiplexer 106 on E-stage target address signal 148. Additionally, if a target address was predicted for the branch instruction, branch resolution logic 124 receives a predicted target address. Branch resolution logic 124 compares the predicted target address with the correct target address 148 and determines whether a misprediction of the target address was made, such as by a BTAC array 102, a BTAC return stack 104, or an F-stage return stack 116, which are all described in detail below. If a target address misprediction was made, branch resolution logic 124 generates a true value on a misprediction signal 158.

Microprocessor 100 also includes branch control logic 112, coupled to multiplexer 106. Branch control logic 112 generates a mux select signal 168 to control multiplexer 106 to select one of multiple input addresses, described below, to output as fetch address 132. The operation of branch control logic 112 is described in more detail below.

Microprocessor 100 also includes an adder 182 that receives fetch address 132 and increments fetch address 132 to provide a next sequential fetch address 162 as an input to multiplexer 106. If no branch instructions are predicted or executed during a given clock cycle, branch control logic 112 controls multiplexer 106 to select next sequential fetch address 162.

Microprocessor 100 also includes a branch target address cache (BTAC) array 102, coupled to receive fetch address 132. BTAC array 102 includes a plurality of storage elements, or entries, each for caching a branch instruction target address and related branch prediction information. When fetch address 132 is input to instruction cache 108 and instruction cache 108 responsively provides the line of instruction bytes 186, BTAC array 102 substantially concurrently provides a prediction of whether a branch instruction is present in the cache line 186, a predicted target address of the branch instruction, and whether the branch instruction is a return instruction. Advantageously, according to the present invention, BTAC array 102 also provides an override indicator for indicating whether the target address of the return instruction should be predicted by the BTAC array 102 rather than by a return stack, as described below in detail.

The target address 164 of the return instruction predicted by BTAC array 102 is provided as an input to a second multiplexer 126. The output of multiplexer 126, target address 144, is provided as an input to multiplexer 106. Target address 144 is also piped down the microprocessor 100 pipeline via pipeline registers 111 and 113, as shown. The output of pipeline register 113 is referred to as target address 176. Although only two pipeline registers 111 and 113 are shown for piping down target address 144, other embodiments may include more pipeline stages.

In one embodiment, BTAC array 102 is configured as a 2-way set associative cache capable of storing 4096 target addresses and related information. However, the present invention is not limited to a particular embodiment of BTAC array 102. In one embodiment, the lower bits of fetch address 132 select one set, or row, in BTAC array 102. An address tag is stored for each entry in BTAC array 102 that indicates the upper address bits of the address of the branch instruction whose target address is stored in the corresponding entry. The upper bits of fetch address 132 are compared with the address tags of each entry of the selected set. If the upper bits of fetch address 132 match a valid address tag in the selected set, then a hit in BTAC array 102 occurs, which indicates that BTAC array 102 predicts a branch instruction is present in the instruction cache line 186 selected by fetch address 132 and output by instruction cache 108 substantially concurrently with target address prediction 164.

Each entry of BTAC array 102 also stores an indication of the type of branch instruction present in the instruction cache line 186 specified by fetch address 132. That is, array 102 also stores the type of the branch instruction whose predicted target address 164 is provided by BTAC array 102 to multiplexer 126. In particular, if the branch instruction type is a return instruction, BTAC array 102 generates a true value on a ret signal 138, which is provided to branch control logic 112. Additionally, BTAC array 102 outputs an override signal 136, discussed in detail below, which is also provided to branch control logic 112. In one embodiment, the branch instruction type field stored in each BTAC array 102 entry comprises two bits, which are encoded as shown in Table 1.

TABLE 1

| | |
|---|---|
| 00 | not RET or CALL |
| 01 | CALL |
| 10 | normal RET |
| 11 | override RET |

In one embodiment, the most significant bit of the branch type field is provided on ret signal 138 and the least significant bit of the override signal is provided on override signal 136. In the case of a CALL instruction, the override signal 136 is not used. As may be observed, no additional storage is required to accommodate the override bit since the type field was already two bits and only three of the four possible states were being used. The override signal 136 is piped down the microprocessor 100 pipeline via pipeline registers 101, 103, 105, and 107, as shown. In particular, the output of pipeline register 103, denoted override_F signal 172, is provided to branch control logic 112. Additionally, the output of pipeline register 107 is denoted override_E signal 174. Although only four pipeline registers 101, 103, 105, and 107 are shown for piping down override signal 136, other embodiments may include more pipeline stages.

In one embodiment, when branch resolution logic 124 resolves a new call instruction, the target address of the call instruction is cached in BTAC array 102 along with a type field value indicating a CALL instruction. Similarly, when branch resolution logic 124 resolves a new return instruction, the target address of the return instruction is cached in BTAC array 102 along with a type field value indicating a normal RET instruction.

Microprocessor 100 also includes a return stack 104, referred to as BTAC return stack 104, coupled to receive ret signal 138 from BTAC array 102. BTAC return stack 104 caches return addresses specified by call instructions in a last-in-first-out manner. In one embodiment, when branch resolution logic 124 resolves a new call instruction, the return address specified by the call instruction is pushed onto the top of BTAC return stack 104. When BTAC array 102 indicates via ret signal 138 that a return instruction is present in the cache line 186 specified by fetch address 132, the return address at the top of BTAC return stack 104 is popped and provided as a target address 142 to multiplexer 126. Branch control logic 112 controls multiplexer 126 via a control signal 184 to select the target address 142 predicted by BTAC return stack 104 if ret signal 138 is true and override signal 136 is false. Otherwise, branch control logic 112 controls multiplexer 126 via control signal 184 to select the target address 164 predicted by BTAC array 102.

Microprocessor 100 also includes a second return stack 116, referred to as F-stage return stack 116, coupled to receive ret signal 154 from instruction decoder 114. F-stage return stack 116 caches return addresses specified by call instructions in a last-in-first-out manner. In one embodiment, when branch resolution logic 124 resolves a new call instruction, the return address specified by the call instruction is pushed onto the top of F-stage return stack 116. When instruction decoder 114 indicates via ret signal 154 that a return instruction has been decoded, the return address at the top of F-stage return stack 116 is popped and provided as a target address 146 to multiplexer 106.

Microprocessor 100 also includes a comparator 118. Comparator 118 compares F-stage return stack 116 target address 146 and piped-down target address 176. Comparator 118 generates a true value on a mismatch signal 152, which is provided to branch control logic 112, if F-stage return stack 116 target address 146 and piped-down target address 176 do not match. Branch control logic 112 controls multiplexer 106 via control signal 168 to select F-stage return stack 116 target address 146 if ret signal 154 is true, if override_F 172 is false, and if mismatch signal 152 is true. Otherwise, branch control logic 112 controls multiplexer 106 via control signal 168 to select one of its other inputs.

Microprocessor 100 also includes BTAC update logic 122, coupled to branch resolution logic 124 and BTAC array 102. BTAC update logic 122 receives misprediction signal 158 from branch resolution logic 124. BTAC update logic 122 receives override_E signal 174 from pipeline register 107. BTAC update logic 122 generates a BTAC update request signal 134, which is provided to BTAC array 102. BTAC update request signal 134 includes information for updating an entry in BTAC array 102. In one embodiment, BTAC update request signal 134 includes a target address of a branch instruction, the address of the branch instruction, and a value for the type field.

When branch resolution logic 124 resolves a new branch instruction, BTAC update logic 122 generates a BTAC update request 134 to update BTAC array 102 with the information for predicting the target address and type of the new branch instruction on a subsequent occurrence, or instance, of the branch instruction in an instruction cache line specified by fetch address 132. Additionally, if misprediction signal 158 is true, BTAC update logic 122 generates a BTAC update request 134 to update the entry in BTAC array 102 associated with the branch instruction. In particular, if the branch instruction is a return instruction that was mispredicted by BTAC return stack 104 or by F-stage return stack 116, BTAC update logic 122 assigns the override bit in the BTAC array 102 entry to a predetermined value to indicate that the BTAC return stack 104 prediction 142 and F-stage return stack 116 prediction 146 should be overridden by the BTAC array 102 prediction 164 on the next occurrence or instance of the return instruction. In one embodiment, the type field is set to an override RET value, or 11 as specified in Table 1 above. Conversely, if the branch instruction is a return instruction that was mispredicted by BTAC array 102 because the override bit was set, BTAC update logic 122 assigns the override bit in the BTAC array 102 entry to a predetermined value to indicate that the BTAC return stack 104 prediction 142 and, if necessary, the F-stage return stack 116 prediction 146 should be selected rather than the BTAC array 102 prediction 164 on the next occurrence or instance of the return instruction. In one embodiment, the type field is set to a normal RET value, or 10 as specified in Table 1 above. The operation of microprocessor 100 will now be described more fully with respect to FIGS. 2 through 4.

Figure 2:
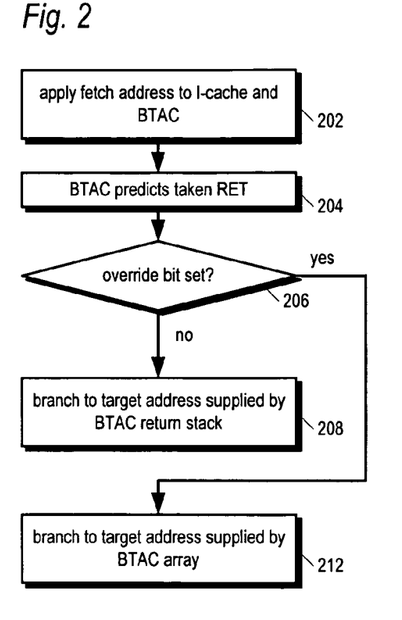
FIG. 2 is a flowchart illustrating operation of the microprocessor of FIG. 1 according to the present invention.

Referring now to FIG. 2, a flowchart illustrating operation of microprocessor 100 of FIG. 1 according to the present invention is shown. FIG. 2 describes the operation of microprocessor 100 in response to a prediction of a return instruction by the BTAC array 102 and the BTAC return stack 104 of FIG. 1. Flow begins at block 202.

At block 202, fetch address 132 of FIG. 1 is applied to instruction cache 108 of FIG. 1 and BTAC array 102 in parallel. In response, instruction cache 108 provides the cache line of instruction bytes 186 of FIG. 1 to the microprocessor 100 pipeline in response to fetch address 132. Flow proceeds to block 204.

At block 204, BTAC array 102 predicts, based on fetch address 132, via ret signal 138 that a return instruction is present in the instruction cache line 186 provided by instruction cache 108 to the microprocessor 100 pipeline, and BTAC array 102 provides target address 164 to multiplexer 126. Flow proceeds to decision block 206.

At decision block 206, branch control logic 112 determines whether override indicator 136 is set. If so, flow proceeds to block 212; otherwise, flow proceeds to block 208.

At block 208, branch control logic 112 controls multiplexer 126 and multiplexer 106 to select the BTAC return stack target address 142 as fetch address 132 to branch microprocessor 100 thereto. Flow ends at block 208.

At block 212, branch control logic 112 controls multiplexer 126 and multiplexer 106 to select the BTAC array target address 164 as fetch address 132 to branch microprocessor 100 thereto. Flow ends at block 212.

As may be observed from FIG. 2, if the override indicator 136 is set, such as during a previous occurrence of the return instruction as described below with respect to block 408, branch control logic 112 advantageously overrides the BTAC return stack 104 and alternatively selects the target address 164 predicted by the BTAC array 102, thereby avoiding an almost certain misprediction by the BTAC return stack 104 if the running program is executing a non-standard call/return sequence.

Figure 3:
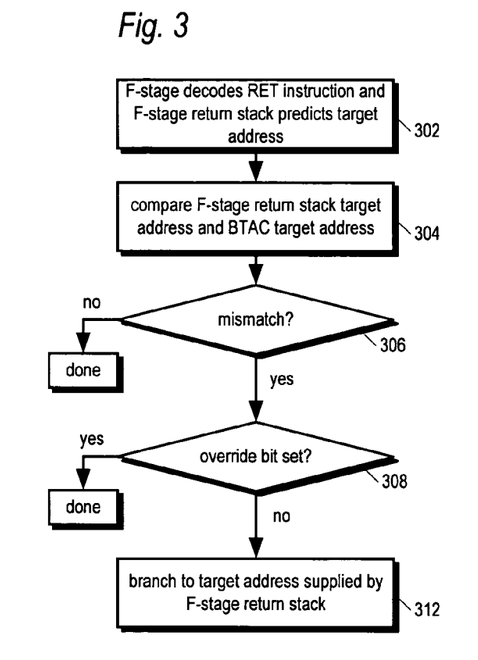
FIG. 3 is a flowchart illustrating operation of the microprocessor of FIG. 1 according to the present invention.

Referring now to FIG. 3, a flowchart illustrating operation of microprocessor 100 of FIG. 1 according to the present invention is shown. FIG. 3 describes the operation of microprocessor 100 in response to a prediction of a return instruction, such as the return instruction predicted in FIG. 2, by F-stage return stack 116 of FIG. 1. Flow begins at block 302.

At block 302, F-stage instruction decoder 114 of FIG. 1 decodes the return instruction that was present in the instruction cache line 186 output by instruction cache 108 in response to fetch address 132 that was applied to BTAC array 102 in block 202 of FIG. 2, and subsequently predicted by BTAC array 102 and BTAC return stack 104 as described with respect to FIG. 2. In response to F-stage instruction decoder 114 indicating via ret signal 154 that a return instruction was decoded, F-stage return stack 116 provides its predicted target address 146 to multiplexer 106. Flow proceeds to block 304.

At block 304, comparator 118 of FIG. 1 compares F-stage return stack predicted target address 146 and target address 176 of FIG. 1. Comparator 118 generates a true value on mismatch signal 152 of FIG. 1 if addresses 146 and 176 do not match. Flow proceeds to decision block 306.

At decision block 306, branch control logic 112 examines mismatch signal 152 to determine whether a mismatch occurred. If so, flow proceeds to decision block 308; otherwise, flow ends.

At decision block 308, branch control logic 112 examines override_F signal 172 of FIG. 1 to determine whether override_F bit 172 is set. If so, flow ends, i.e., the branch to the BTAC array target address 164 performed at block 212 of FIG. 2 is not superceded by the F-stage return stack predicted target address 146. If override_F bit 172 is clear, flow proceeds to block 312.

At block 312, branch control logic 112 controls multiplexer 106 to select the F-stage return stack predicted target address 146 to branch microprocessor 100 thereto. In one embodiment, before branching to the F-stage return stack predicted target address 146, microprocessor 100 flushes the instructions in the stages above the F-stage. Flow ends at block 312.

As may be observed from FIG. 3, if override_F indicator 172 is set, such as during a previous occurrence of the return instruction as described below with respect to block 408, branch control logic 112 advantageously overrides the F-stage return stack 116 and alternatively sustains the target address 164 predicted by the BTAC array 102, thereby avoiding an almost certain misprediction by the F-stage return stack 116 if the running program is executing a non-standard call/return sequence.

Figure 4:
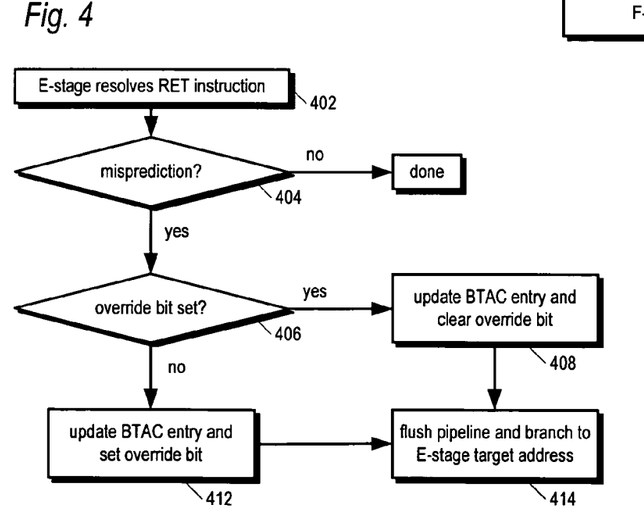
FIG. 4 is a flowchart illustrating operation of the microprocessor of FIG. 1 according to the present invention.

Referring now to FIG. 4, a flowchart illustrating operation of microprocessor 100 of FIG. 1 according to the present invention is shown. FIG. 4 describes the operation of microprocessor 100 in response to resolution of a return instruction, such as a previous instance of the return instruction predicted and decoded in FIGS. 2 and 3. Flow begins at block 402.

At block 402, E-stage branch resolution logic 124 of FIG. 1 resolves a return instruction. That is, branch resolution logic 124 finally determines the correct target address 148 of FIG. 1 of the return instruction. In particular, branch resolution logic 124 generates a true value on misprediction signal 158 of FIG. 1 if microprocessor 100 was caused to branch to an incorrect target address of the return instruction. Flow proceeds to decision block 404.

At decision block 404, BTAC update logic 122 examines misprediction signal 158 to determine whether the return instruction target address was mispredicted. If so, flow proceeds to decision block 406; otherwise flow ends.

At decision block 406, BTAC update logic 122 examines override_E signal 174 to determine whether the override_E bit 174 is set. If so, flow proceeds to block 408; otherwise, flow proceeds to block 412.

At block 408, BTAC update logic 122 generates a BTAC update request 134 to clear the override bit for the entry that mispredicted the return instruction. The present inventors have observed that a given return instruction may be reached from multiple program paths. That is, sometimes a return may be reached from a non-standard code path, such as one of the code paths described above, which always cause a return stack to mispredict the target address of the return instruction; however, the same return instruction may also be reached from a code path that constitutes a standard call/return pair sequence. In the latter case, return stacks generally more accurately predict the target address of a return instruction. Consequently, if a misprediction occurs when the override bit is set, BTAC update logic 122 clears the override bit in block 408 because it is anticipated that the standard call/return pair sequence is predominating. Flow proceeds to block 414.

At block 412, BTAC update logic 122 generates a BTAC update request 134 to set the override bit in the appropriate entry in BTAC array 102 since F-stage return stack 116 mispredicted the return instruction target address. By setting the BTAC 102 override bit for the entry storing the prediction for the return instruction, the present invention advantageously solves the problem created by a non-standard call/return sequence. That is, the BTAC array target address 164 is branched to rather than branching to the BTAC return stack target address 142 or the F-stage return stack predicted target address 146, which would incorrectly predict the return instruction target address. Flow proceeds to block 414.

At block 414, microprocessor 100 flushes its pipeline, since the misprediction of the return instruction target address caused the incorrect instructions to be fetched into the microprocessor 100 pipeline from instruction cache 108; hence, those instructions must not be executed. Subsequently, branch control logic 112 controls multiplexer 106 to select the E-stage target address 146 to branch microprocessor 100 thereto in order to fetch the correct target instructions. Flow ends at block 414.

In one embodiment, block 412 updates the type field of the BTAC array 102 entry with a binary value of 11 and block 408 updates the type field of the BTAC array 102 entry with a binary value of 10, according to Table 1 above.

As may be observed from FIGS. 2 through 4, the override indicator potentially improves the prediction accuracy for a return instruction. If the microprocessor senses that a return instruction may have been executed as part of a non-standard call/return sequence by the fact that the return stack mispredicted the target address of the return instruction, then the microprocessor sets the override indicator associated with the return instruction in the BTAC, and on the next instance of the return instruction, the microprocessor uses a prediction mechanism other than the return stack to predict the return instruction target address, since the microprocessor determines from the override indicator that the return stack is likely to mispredict the target address for the present occurrence of the return instruction. Conversely, although a return instruction may have been previously executed as part of a non-standard call/return sequence, if the microprocessor senses that the return instruction may subsequently have been executed as part of a standard call/return sequence by the fact that the BTAC array mispredicted the return instruction target address, then the microprocessor clears the override indicator associated with the return instruction in the BTAC, and on the next instance of the return instruction, the microprocessor uses the return stack to predict the return instruction target address, since the microprocessor determines from the override indicator that the return stack is likely to correctly predict the target address for the present occurrence of the return instruction.

Figure 5:
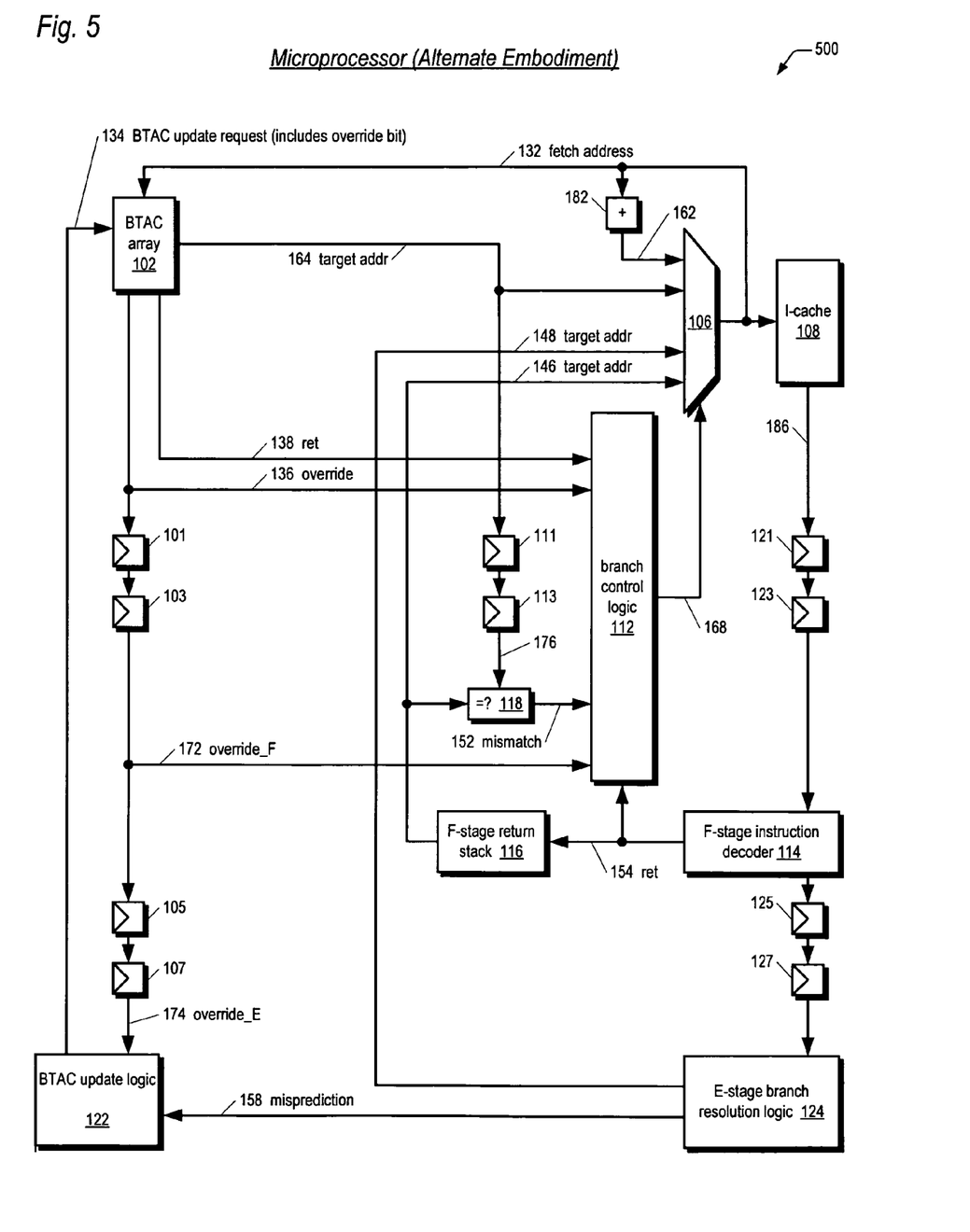
FIG. 5 is a block diagram of a pipelined microprocessor according to an alternate embodiment of the present invention.

Referring now to FIG. 5, a block diagram of a pipelined microprocessor 500 according to an alternate embodiment of the present invention is shown. Microprocessor 500 of FIG. 5 is similar to microprocessor 100 of FIG. 1, except that it does not include BTAC return stack 104 or multiplexer 126. Consequently, the predicted target address 164 output by BTAC array 102 is provided directly to multiplexer 106, rather than through multiplexer 126. Additionally, BTAC array 102 target address 164, rather than target address 144 of FIG. 1, is provided as the input to pipeline register 111 and piped down as target address 176.

Figure 6:
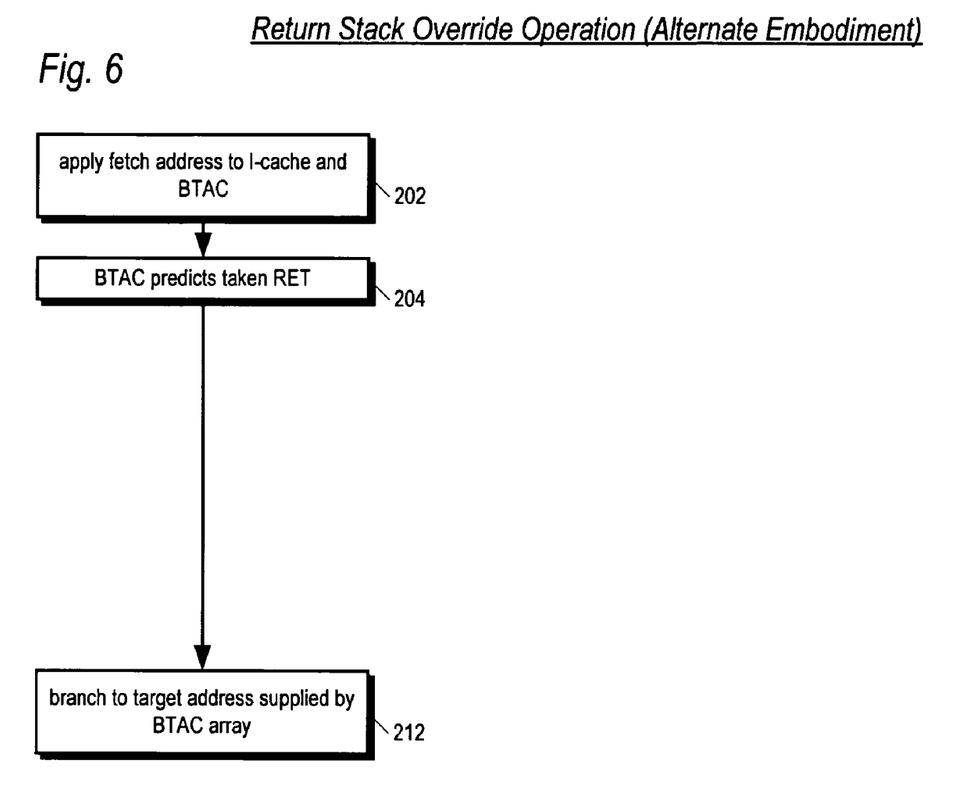
FIG. 6 is a flowchart illustrating operation of the microprocessor of FIG. 5 according to an alternate embodiment of the present invention.

Referring now to FIG. 6, a flowchart illustrating operation of microprocessor 500 of FIG. 5 according to an alternate embodiment of the present invention is shown. FIG. 6 is similar to FIG. 2, except that decision block 206 and block 208 are not present; hence, flow proceeds from block 204 to block 212. Therefore, when BTAC array 102 predicts a return instruction via ret signal 138, branch control logic 112 always operates to cause microprocessor 500 to branch to the target address 164 predicted by BTAC array 102, since BTAC return stack 104 and multiplexer 126 of microprocessor 100 of FIG. 1 are not present in microprocessor 500 of FIG. 5.

Microprocessor 500 of FIG. 5 also operates according to the flowcharts of FIGS. 3 and 4. It is noted that since BTAC return stack 104 is not present in microprocessor 500, piped-down target address 176 is always the BTAC array 102 target address 164; hence, the comparison performed in block 304 between F-stage return stack 116 target address 146 and target address 176 is always a comparison with piped-down BTAC array 102 target address 164.

Although the present invention and its objects, features and advantages have been described in detail, other embodiments are encompassed by the invention. For example, although embodiments have been described wherein the microprocessor has two return stacks, the microprocessor may have other numbers of returns stacks, such as only a single return stack, or more than two return stacks. Furthermore, although embodiments are described in which the BTAC is the alternate target address prediction mechanism for overriding the return stack in addition to storing the override bit associated with the return instruction mispredicted by the return stack, other alternate target address prediction mechanisms may be employed, such as a branch target buffer.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor, comprising:
a first return stack, for providing a first prediction of a target address of a return instruction;
a branch target address cache (BTAC), for providing a second prediction of said target address of said return instruction, and for providing an override indicator, wherein said override indicator indicates a predetermined value if said first prediction mispredicted said target address for a first instance of said return instruction;
branch control logic, coupled to said first return stack and said BTAC, for causing the microprocessor to branch to said second prediction of said target address, and not to said first prediction, for a second instance of said return instruction, if said override indicator indicates said predetermined value; and
a second return stack, coupled to said branch control logic, for providing a third prediction of said target address of said return instruction.

2. The microprocessor of claim 1, wherein said second instance is subsequent to said first instance.

3. The microprocessor of claim 1, further comprising:
update logic, coupled to said BTAC, for updating said override indicator to said predetermined value if said first prediction mispredicted said target address for said first instance of said return instruction.

4. The microprocessor of claim 3, wherein said update logic updates said override indicator to a second predetermined value if said second prediction mispredicted said target address for a third instance of said return instruction, wherein said second predetermined value is distinct from said predetermined value.

5. The microprocessor of claim 4, wherein said branch control logic causes the microprocessor to branch to said first prediction of said target address for a fourth instance of said return instruction, if said override indicator indicates said second predetermined value.

6. The microprocessor of claim 5, further comprising:
a comparator, coupled to said branch control logic, for comparing said first prediction with said second prediction, wherein if said override indicator indicates said second predetermined value, said branch control logic causes the microprocessor to branch to said first prediction of said target address only if said comparator indicates said first and second prediction do not match.

7. The microprocessor of claim 4, wherein said third instance of said return instruction is subsequent to said second instance.

8. The microprocessor of claim 4, wherein said third instance of said return instruction is said second instance.

9. The microprocessor of claim 1, wherein said first return stack provides said first prediction subsequent to said BTAC providing said second prediction.

10. The microprocessor of claim 1, further comprising:
instruction decode logic, coupled to said branch control logic, for decoding said return instruction, wherein said first return stack provides said first prediction in response to said instruction decode logic decoding said return instruction.

11. The microprocessor of claim 10, wherein said first return stack stores said first prediction of said target address in response to said instruction decode logic decoding a call instruction.

12. The microprocessor of claim 1, wherein said first return stack provides said first prediction substantially concurrently with said BTAC providing said second prediction.

13. The microprocessor of claim 1, wherein said BTAC is further configured to provide an indication that said return instruction is present in a cache line of instruction bytes provided by an instruction cache.

14. The microprocessor of claim 13, wherein said first return stack provides said first prediction in response to said BTAC providing said indication that said return instruction is present in said cache line.

15. The microprocessor of claim 13, wherein said BTAC provides said indication that said return instruction is present in said cache line in response to an instruction fetch address specifying said cache line in said instruction cache.

16. The microprocessor of claim 1, wherein said first return stack stores said first prediction of said target address in response to said BTAC providing an indication that a call instruction is present in an instruction cache line.

17. The microprocessor of claim 1, wherein said branch control logic causes the microprocessor to branch to said second prediction of said target address, and not to said first prediction and not to said third prediction, for second instance of said return instruction, if said override indicator indicates said predetermined value.

18. The microprocessor of claim 17, wherein said branch control logic causes the microprocessor to branch to said third prediction of said target address for said second instance of said return instruction, if said override indicator indicates other than said predetermined value.

19. The microprocessor of claim 18, further comprising:
a comparator, coupled to said branch control logic, for comparing said first prediction with said third prediction.

20. The microprocessor of claim 19, wherein if said comparator indicates said first and third prediction do not match, and if said override indicator indicates other than said predetermined value, said branch control logic causes the microprocessor to branch to said first prediction after branching to said third prediction.

21. The microprocessor of claim 1, wherein said branch control logic comprises a multiplexer for selecting one of said first and second predictions to provide to an instruction cache as a fetch address for causing the microprocessor to branch to said selected one of said first and second predictions.

22. An apparatus for improving branch prediction accuracy in a microprocessor having a branch target address cache (BTAC), a first return stack, and a second return stack that each generate a prediction of a target address of a return instruction, the apparatus comprising:
an override indicator;
update logic, coupled to said override indicator, for updating said override indicator to a true value if the prediction generated by at least one of the first and second return stacks mispredicted the target address of a first occurrence of the return instruction; and
branch control logic, coupled to said override indicator, for selecting the prediction generated by the BTAC for a second occurrence of the return instruction, rather than selecting the prediction generated by the first return stack, if said override indicator is true;
wherein said branch control logic selects the prediction generated by the BTAC for said second occurrence of the return instruction, rather than selecting the predictions generated by the first and second return stacks, if said override indicator is true.

23. The apparatus of claim 22, wherein said second occurrence of the return instruction is subsequent to said first occurrence.

24. The apparatus of claim 22, wherein said override indicator is provided by the BTAC.

25. The apparatus of claim 24, wherein the BTAC stores a plurality of override indicators for a plurality of return instructions, wherein if one of said plurality of return instructions is the return instruction, the BTAC provides one of said plurality of override indicators for the return instruction as said override indicator.

26. The apparatus of claim 25, wherein said BTAC determines if one of said plurality of return instructions is the return instruction based on a fetch address input, wherein said fetch address is an address input of an instruction cache of the microprocessor.

27. The apparatus of claim 22, wherein said update logic updates said override indicator to a false value if the prediction generated by the BTAC mispredicted the target address of said first occurrence of the return instruction.

28. The apparatus of claim 22, wherein if said override indicator is false, said branch control logic selects the prediction generated by the first return stack for said second occurrence of the return instruction, rather than selecting the prediction generated by the BTAC.

29. The apparatus of claim 28 further comprising:
a comparator, coupled to said branch control logic, for comparing the prediction generated by the first return stack with the prediction generated by the second return stack.

30. The apparatus of claim 29, wherein if said comparator indicates the prediction of said second instance of said return instruction generated by the first return stack does not match the prediction of said second instance of said return instruction generated by the second return stack, and if said override indicator is false, said branch control logic selects the prediction of said second instance of said return instruction generated by the second return stack after selecting the prediction of said second instance of said return instruction generated by the first return stack.

31. The apparatus of claim 22, further comprising:
a comparator, coupled to said branch control logic, for comparing the prediction generated by the BTAC for said second occurrence of the return instruction with the prediction generated by the first return stack for said second occurrence of the return instruction.

32. The apparatus of claim 31, wherein if said override indicator is false, said branch control logic selects the prediction generated by the BTAC for said second occurrence of the return instruction, and subsequently selects the prediction generated by the first return stack for said second occurrence of the return instruction, if said comparator indicates the prediction generated by the first return stack does not match the prediction generated by the BTAC.

33. The apparatus of claim 32, wherein said branch control logic receives the prediction generated by the BTAC in a first clock cycle previous to a second clock cycle in which said branch control logic receives the prediction generated by the first return stack.

34. A method for predicting a target address of a return instruction in a microprocessor, the method comprising:
updating an override indicator to a true value in response to at least one of a first return stack and a second return stack mispredicting the target address of a first instance of the return instruction;
by a branch target address cache (BTAC), generating a prediction of the target address of a second instance of the return instruction subsequent to said updating;
by the first return stack, generating a prediction of the target address of the second instance of the return instruction subsequent to said updating;
by the second return stack, generating a prediction of the target address of the second instance of the return instruction subsequent to said generating a prediction by the first return stack;
determining whether the override indicator has a true value after said BTAC generating the prediction; and
branching the microprocessor to the prediction of the target address of the second instance of the return instruction generated by the BTAC, and not to the predictions of the target address of the second instance of the return instruction generated by the first and second return stacks, if the override indicator has a true value.

35. The method of claim 34, further comprising:
updating the override indicator to a false value in response to the BTAC mispredicting the target address of the return instruction.

36. The method of claim 34, further comprising:
branching the microprocessor to the prediction generated by the BTAC; and
comparing the prediction generated by the BTAC with the prediction generated by the second return stack, after said branching the microprocessor to the prediction generated by the BTAC.

37. The method of claim 36 further comprising:
branching the microprocessor to the prediction generated by the second return stack, if the prediction generated by the BTAC does not match the prediction generated by the second return stack, and if the override indicator has a false value.

38. The method of claim 37, further comprising:
by the BTAC, predicting the return instruction is present in a cache line provided by an instruction cache, in response to a fetch address, wherein said fetch address specifies the cache line provided by the instruction cache.

39. The method of claim 38, wherein said BTAC generating the target address of the return instruction comprises generating the target address in response to said BTAC predicting the return instruction is present in the cache line.

40. The method of claim 38, wherein said second return stack generating the prediction of the target address of the return instruction comprises generating the target address in response to said BTAC predicting the return instruction is present in the cache line.

41. The method of claim 34, further comprising:
decoding the return instruction, after said BTAC generating the prediction of the target address.

42. The method of claim 41, wherein said second return stack generating the prediction of the target address of the return instruction comprises generating the target address in response to said decoding the return instruction.

43. The method of claim 41, wherein said decoding the return instruction is performed after the return instruction is output by an instruction cache.

44. The method of claim 34, further comprising:
branching the microprocessor to the prediction of the target address of the second instance of the return instruction generated by the first return stack, if the override indicator has a false value.

45. The method of claim 44, further comprising:
comparing the predictions of the target address of the second instance of the return instruction generated by the first and second return stacks.

46. The method of claim 45, further comprising:
branching the microprocessor to the prediction the target address of the second instance of the return instruction generated by the second return stack after said branching the microprocessor to the prediction of the target address of the second instance of the return instruction generated by the first return stack, if said comparing indicates the predictions of the target address of the second instance of the return instruction generated by the first and second return stacks do not match, and if the override indicator is false.

47. An apparatus for improving branch prediction accuracy in a microprocessor having first and second return stacks and a branch target buffer that each generate a prediction of a target address of a return instruction, and a branch target address cache (BTAC), the apparatus comprising:

an override indicator, provided by the BTAC;

update logic, coupled to said override indicator, for updating said override indicator in the BTAC to a true value if the prediction generated by at least one of the first and second return stacks mispredicted the target address of a first occurrence of the return instruction; and branch control logic, coupled to said override indicator, for selecting the prediction generated by the branch target buffer for a second occurrence of the return instruction, rather than selecting the predictions generated by the first and second return stacks if said override indicator is true;

wherein said branch control logic selects the prediction generated by the branch target buffer for said second occurrence of the return instruction, rather than selecting the predictions generated by the first and second return stacks, if said override indicator is true.

48. A computer program product embodied on a computer-readable storage medium, comprising:

computer-readable program code for providing a microprocessor, said program code comprising:

first program code for providing a first return stack, for providing a first prediction of a target address of a return instruction;

second program code for providing a branch target address cache (BTAC), for providing a second prediction of said target address of said return instruction, and for providing an override indicator, wherein said override indicator indicates a predetermined value if said first prediction mispredicted said target address for a first instance of said return instruction;

third program code for providing branch control logic, coupled to said first return stack and said BTAC, for causing the microprocessor to branch to said second prediction of said target address, and not to said first prediction, for a second instance of said return instruction, if said override indicator indicates said predetermined value; and fourth program code for providing a second return stack, coupled to said branch control logic, for providing a third prediction of said target address of said return instruction.

* * * * *